(12) United States Patent
Bonnell (10) Patent No.: US 10,922,204 B2
(45) Date of Patent: Feb. 16, 2021

(54) EFFICIENT BEHAVIORAL ANALYSIS OF TIME SERIES DATA

(71) Applicant: CA, Inc., New York, NY (US)

(72) Inventor: Christopher Phillip Bonnell, Longmont, CO (US)

(73) Assignee: CA, Inc., New York, NY (US)

(*) Notice: Subject to any disclaimer, the term of this patent is extended or adjusted under 35 U.S.C. 154(b) by 173 days.

(21) Appl. No.: 16/007,816

(22) Filed: Jun. 13, 2018

(65) Prior Publication Data

US 2019/0384662 A1 Dec. 19, 2019

(51) Int. Cl.
*G06F 11/30* (2006.01)
*G06F 16/901* (2019.01)

(52) U.S. Cl.
CPC ........ *G06F 11/3072* (2013.01); *G06F 11/302* (2013.01); *G06F 16/9024* (2019.01)

(58) Field of Classification Search
CPC ............. G06F 11/2257; G06F 11/3006; G06F 11/3017; G06F 11/302; G06F 11/3072; G06F 11/3447; G06F 11/452; G06F 16/9024; H04L 41/0622; H04L 41/16; G06N 20/00
See application file for complete search history.

(56) References Cited

U.S. PATENT DOCUMENTS

| | | |
|---|---|---|
| 5,544,281 A | 8/1996 | Maruoka et al. |
| 7,954,090 B1 | 5/2011 | Qureshi et al. |
| 2003/0139905 A1* | 7/2003 | Helsper ............... G06F 11/3006 702/182 |
| 2005/0289071 A1* | 12/2005 | Goin ..................... G06F 11/008 705/56 |
| 2007/0038838 A1* | 2/2007 | Greis .................... G06F 11/008 711/207 |

(Continued)

OTHER PUBLICATIONS

"Wave Function Collapse Algorithm", [online] retrieved on Mar. 1, 2018 from <https://github.com/mxgmn/WaveFunctionCollapse>, 12 pages.

(Continued)

*Primary Examiner* — Gabriel Chu
(74) *Attorney, Agent, or Firm* — Foley & Lardner LLP (57) ABSTRACT

An in-depth behavioral analysis of time-series metric data can require time consuming and computationally expensive statistical processing. To provide a more efficient behavioral analysis of a component within an environment, an application behavioral analysis system captures time-series metric data for a component, such as an application, and generates tiles comprising metric values from sequential segments of the metric data. After generating the tiles, the system iterates through the tiles of each segment and determines whether the segment shares matching tiles with other segments of the metric data. The system generates a behavioral analysis for the component based on the segments with shared tiles. The behavioral analysis may include a matrix or graph data structure which indicates the related segments. From this behavioral analysis, the system can efficiently identify common and reoccurring behaviors for a component without performing complex statistical processing of the metric data.

16 Claims, 7 Drawing Sheets

(56) References Cited

U.S. PATENT DOCUMENTS

| | | | |
|---|---|---|---|
| 2010/0083055 A1* | 4/2010 | Ozonat | G06F 11/3419 |
| | | | 714/47.2 |
| 2011/0276836 A1* | 11/2011 | Kahana | G06Q 10/04 |
| | | | 714/38.1 |
| 2013/0097706 A1 | 4/2013 | Titonis et al. | |
| 2014/0096249 A1* | 4/2014 | Dupont | G06F 21/00 |
| | | | 726/23 |
| 2015/0007173 A1 | 1/2015 | Ionescu et al. | |
| 2016/0315826 A1* | 10/2016 | Abdulnour | H04L 41/16 |
| 2017/0010930 A1* | 1/2017 | Dutta | G06F 11/323 |
| 2017/0010931 A1* | 1/2017 | Agarwal | G06F 11/079 |
| 2017/0097980 A1* | 4/2017 | Ishii | G06F 16/285 |
| 2017/0208080 A1* | 7/2017 | Sakamoto | H04L 63/1425 |
| 2019/0095266 A1* | 3/2019 | Chen | G06F 11/3447 |

OTHER PUBLICATIONS

Hébert-Dufresne, et al., "Multi-scale structure and topological anomaly detection via a new network statistic: The onion decomposition", Scientific Reports 6, Article No. 31708 (2016), 23 pages.

* cited by examiner

EFFICIENT BEHAVIORAL ANALYSIS OF TIME SERIES DATA

BACKGROUND

The disclosure generally relates to the field of data processing, and more particularly to application monitoring and analysis.

Multiple instances of a same computing application can be executed within container clusters, such container clusters provided through a Container as a Service (CaaS) software, and distributed over a plurality of servers, cloud infrastructures, etc. The performance and health of the application instances can be tracked and viewed through system monitoring software which collects measurements for various metrics from the application instances. The monitoring software may have functionality for generating alerts when application instances fail or when various metric measurements exceed predefined thresholds.

BRIEF DESCRIPTION OF THE DRAWINGS

Aspects of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to monitoring application instances in illustrative examples. Aspects of this disclosure can be also applied to other complex systems with multiple components of a same type, such as networks with multiple routers, switches, servers, etc., or mechanical systems instrumented with multiple sensors of same type reporting measurements. In other instances, well-known instruction instances, protocols, structures, and techniques have not been shown in detail in order not to obfuscate the description.

Overview

Virtualization of hardware and software resources has made executing hundreds of instances of a same component a trivial process. Corresponding to this increase in components is a drastic increase in the amount of metric data to be analyzed for monitoring the performance and health of the components. While metric values may be graphed or charted, these displays do little to identify recurring or prominent behaviors of a component. Typically, an in-depth behavioral analysis of time-series metric data requires time consuming and computationally expensive statistical processing. To provide a more efficient behavioral analysis of a component within an environment, an application behavioral analysis system captures time-series metric data for a component, such as an application, and generates tiles comprising metric values from sequential segments of the metric data. After generating the tiles, the system iterates through each segment and determines whether the segment shares matching tiles with other segments of the metric data. The system generates a behavioral analysis for the component based on the segments with shared tiles. The behavioral analysis may include a matrix or graph data structure which indicates the related segments. From this behavioral analysis, the system can efficiently identify common and reoccurring behaviors for a component without performing complex statistical processing of the metric data. Common behaviors, for example, may be indicated by large or tightly coupled clusters of segments indicated in the behavioral analysis. Additionally, anomalous behaviors of a component may be identified by determining whether new metric data aligns with previously determined behaviors for the component.

Terminology

The description uses the term "metric data" to refer to measurements or values related to various performance indicators or events occurring at component instances, such as application instances. The term "metric" refers to a type or standard of measurement. Metrics can include performance metrics such as central processing unit (CPU) load, memory usage, disk input/output operations (disk I/O or IOPS), Hypertext Transfer Protocol (HTTP) requests, bandwidth usage, etc., and can also include application or domain specific metrics such as a number of authentication requests for an application which includes a service for authenticating users. The data of the metrics includes the measurements or values recorded overtime for each of the metric types. This data may be referred to as "time-series data" since the recorded measurements are temporally consecutive.

The description uses the term "anomaly" to refer to an abnormal behavior or condition of an application instance. An application instance is anomalous if the behavior or metric data of the application instance deviates from normal or expected values or parameters. The normal or expected values or behaviors for an application instance are determined or inferred based on the values and behaviors of other instances of a same application. If, for example, the metric values or behaviors of an application instance have been experienced by at least one other application instance in a system, then it can be inferred that the application instance is behaving as expected. If, however, the metric values or behaviors have not been replicated by any other application instance, then the application instance is determined to be anomalous or to be experiencing an anomaly.

Example Illustrations

Figure 1:
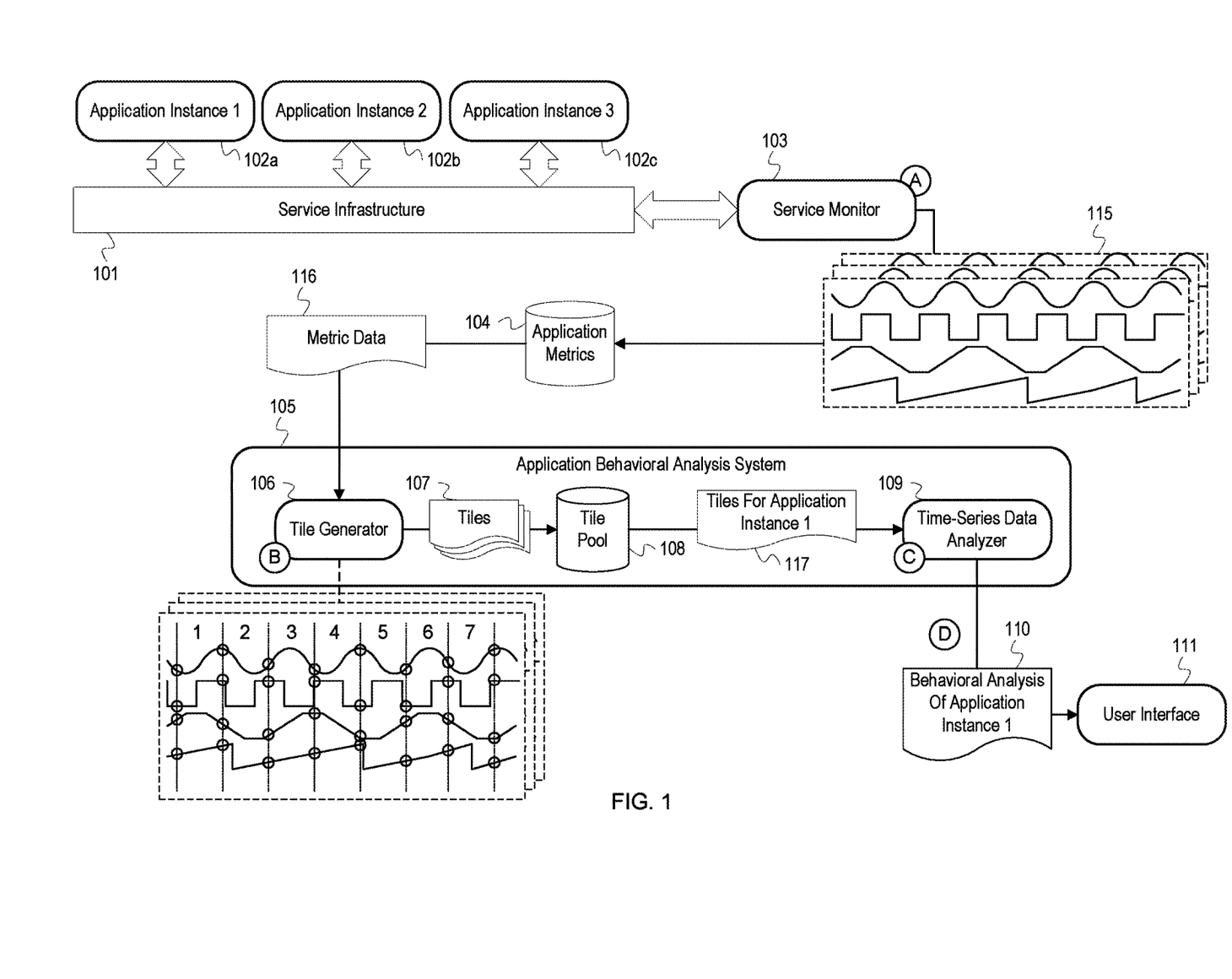
FIG. 1 depicts an example environment for an application behavioral analysis system which identifies behaviors of application instances through segmented comparison of time-series metric data.

FIG. 1 depicts an example environment for an application behavioral analysis system which identifies behaviors of application instances through tile-based comparisons of time-series metric data. FIG. 1 depicts a service infrastructure 101 which hosts an application instance 1 102*a*, an application instance 2 102*b*, and an application instance 2 102*c* (collectively referred to as "application instances 102"). A service monitor 103 communicates with the service infrastructure 101 to receive data related to the application instances 102. FIG. 1 also depicts an application behavioral analysis system 105 that includes a tile generator 106, a tile pool 108, and a time-series data analyzer 109 ("data analyzer 109"). The application behavioral analysis system 105 provides data to a user interface 111. The service monitor 103 and the data analyzer 109 are communicatively coupled to an application metrics database 104.

The application instances 102 are executing instances or instantiations of a same application. For example, each of the application instances 102 may be a front-end interface for accessing a database. Having multiple instances of an application allows for load balancing and redundancy in the event of application instance failures. Each of the application instances 102 may be containerized or isolated in a way that each of the application instances 102 runs independently of the others, even if they are executing on a same server. The service infrastructure 101 includes a variety of hardware and software resources to enable execution of the application instances 102. The service infrastructure 101 provides memory, processor(s), and storage for the application instances 102 and can also include a host operating system running a hypervisor to provide guest operating systems, binaries, and libraries for the application instances 102. The service infrastructure 101 also includes software such as agents/probes for monitoring and reporting, periodically or on-request, metric data for the application instances 102.

At stage A, the service monitor 103 receives time-series metric data 115 for one or more of the application instances 102 from the service infrastructure 101. The service monitor 103 is a software service which executes independently of the application instances 102 and the service infrastructure 101 to monitor the application instances 102 and collect the metric data 115. The service monitor 103 may periodically request the metric data 115 regarding the application instances 102 through the service infrastructure 101 or receive the metric data 115 in a data stream from the service infrastructure 101. The metric data 115 includes measurements recorded over time for various metrics of the application instances 102. FIG. 1 depicts the received measurements of the metric data 115 as a collection of continuous waves or signals to illustrate that the measurements constitute a set of time series data. In actuality, the metric data 115 comprises metrics with measurements sampled at various intervals. For example, the CPU load for an application instance may be measured every second. The metric data 115 includes a set of metric measurements for each of the application instances 102. For example, the metric data 115 may include memory usage measurements for each of the application instance 1 102a, the application instance 2 102b, and the application instance 3 102c. Since the application instances 102 are each instances of a same application, the same metrics are available for each of the application instances 102. The service monitor 103 stores the metric data 115 in the metrics database 104. Each metric measurement in the metric data 115 may be stored as a tuple comprising a metric identifier/key, a metric measurement/value, a timestamp, and an application instance identifier.

At stage B, the tile generator 106 retrieves metric data 116 from the metrics database 104 and generates tiles 107 based on the metric data 116. The metric data 116 includes metric measurements for one or more of the application instances 102; however, the metric data 116 may be a subset of the metric data 115. The tile generator 106 may submit a query to the metrics database 104 to request metric data for a specific time period, request a number of most recent entries to the metrics database 104, request all new entries to the metrics database 104 since a previously retrieved entry, etc. In some instances, not all collected metrics will be used in tiles, so the tile generator 206 may request only particular metrics. The tile generator 206 may focus on particular metrics since certain metrics may be more likely to indicate an anomaly than other metrics or may be more likely to be associated with a severe anomaly. For example, bandwidth usage or HTTP requests metrics can help determine whether an application instance may respond slowly while memory usage or CPU load metrics may be more helpful in determining whether a total failure of an application instance is likely.

To generate tiles, the tile generator 106 divides the metric data 116 for each of the application instances into equal segments or slices. In FIG. 1, for example, the metric data 116 is divided into segments 1-7. Segments may be based on a time interval such as every 1 second, 5 seconds, etc. or may be based on a number of metric measurements, such as every third recorded measurement. Next, the tile generator 106 identifies boundary values for each of the segments. In FIG. 1, the boundary values are shown as circles which identify the metric measurements recorded at points corresponding to the beginning and end of a segment. A tile is a set of metric values corresponding to a start and an end of a segment of metric data. The values used for the tiles may be normalized, rounded, filtered through a sigmoid function, etc. to increase the chances of matching tile values during reconstruction at stage C below. For example, if a metric measurement is indicated as a floating point value, the metric measurement may be rounded to the nearest tenth or hundredth decimal place. Additionally, as illustrated in more detail in FIG. 2, data for multiple metrics may be grouped together to create multi-dimensional tiles. For example, CPU load, memory usage, and disk TOPS metrics may be grouped to create a tile based on measurements from each of the three metrics. After generating the tiles 107, the tile generator 106 stores the tiles 107 in the tile pool 108. The tile pool 108 may be a structure in memory of the application behavioral analysis system 105 or may be a database or other storage device. Each tile may be associated with an application instance identifier and metric identifiers for the one or more metric values indicated in the tile. The boundary values for a segment may be stored as an ordered pair representing a beginning and end value, respectively, e.g. (x, y).

At stage C, the data analyzer 109 retrieves tiles 117 for application instance 1 from the tile pool 108. The tiles 117 comprise one or more temporally sequential sets of tiles generated by the tile generator 106 from time-series metric data of the application instance 1 102a. Each set of tiles corresponds to one or more metric types for the application instance 1 102a. The tiles 117 may have been generated from metric data of a most recent time period, such as the previous ten seconds, or may include a specified number of new or recently added tiles for the application instance 1 102a. Each tile corresponds to a segment of the metric data for the application instance 1 102a.

To identify patterns or behaviors in the metric data, the data analyzer 109 analyzes the tiles 117 by iterating through tiles from each segment (i.e., the segments 1-7). Each segment may be said to indicate a behavior of the application instance 1 102a based on the metric data of tiles within that segment. For example, based on tiles within a segment, it can be determined that the application instance 1 102a is experiencing a behavior of low memory and high CPU load. The identification of related segments or patterns of segments indicates how often the corresponding behavior occurs. The data analyzer 109 selects tiles from a segment and determines whether any tile of the current segment matches or can be rebuilt using a tile generated from metric data of other segments. In FIG. 1, the data analyzer 109 determines whether tiles from segment 1 match any tiles from segments 2-7. Two tiles match if the boundary values indicated in the tiles are the same. The data analyzer 109 determines patterns or behaviors for the application instance 1 102*a* based on which tiles from other segments can rebuild tiles in the current segment being analyzed. For example, if a tile in segment 2 matches tiles in segments 4 and 6, the data analyzer 109 determines that the application instance 1 102*a* is experiencing a repetitive behavior which occurs at every other segment time interval. The behavioral analysis process is described in more detail in FIG. 3.

At stage D, the data analyzer 109 communicates a behavioral analysis 110 of the application instance 1 102*a* to the user interface 111. The behavioral analysis 110 may comprise a matrix identifying segments with matching tiles, a graph data structure indicating clusters of related segments, or metric data corresponding to frequently occurring or related behaviors. The data analyzer 109 may also identify segments with tiles which did not match tiles of other segments as indicating potentially anomalous behaviors. For example, if the segment 3 contained tiles that did not match any other segment, the data analyzer 109 can provide the metric data from segment 3 and indicate that the application instance 1 102*a* may have experienced an anomaly at the time period corresponding to segment 3. The user interface 111 may be part of a software management or monitoring system used by administrators. In response to receiving the behavioral analysis 110, the user interface 111 may display a matrix or graph data structure included in the behavioral analysis 110. Additionally, if the data analyzer 109 identified segments as potentially anomalous, the user interface 111 may create an alert or warning and display metric data related to the anomalous segments.

The operations of stages C and D are repeated for the application instance 2 102*b* and the application instance 3 102*c* to determine behavioral patterns for those application instances. Moreover, the operations of stages B, C, and D may be repeated for each of the application instances 102 periodically or after a specified amount of new metric data is added to the metrics database 104. The behavioral analysis of stage C may be cumulative in that tiles from new metric data may be compared to previously identified behaviors to determine whether the application instances 102 are behaving as expected. For example, if a repetitive behavior was previously identified for the application instance 1 102*a*, the data analyzer 109 may determine that the application instance 1 102*a* is behaving anomalously if new metric data no longer indicates that the repetitive behavior is occurring.

Figure 2:
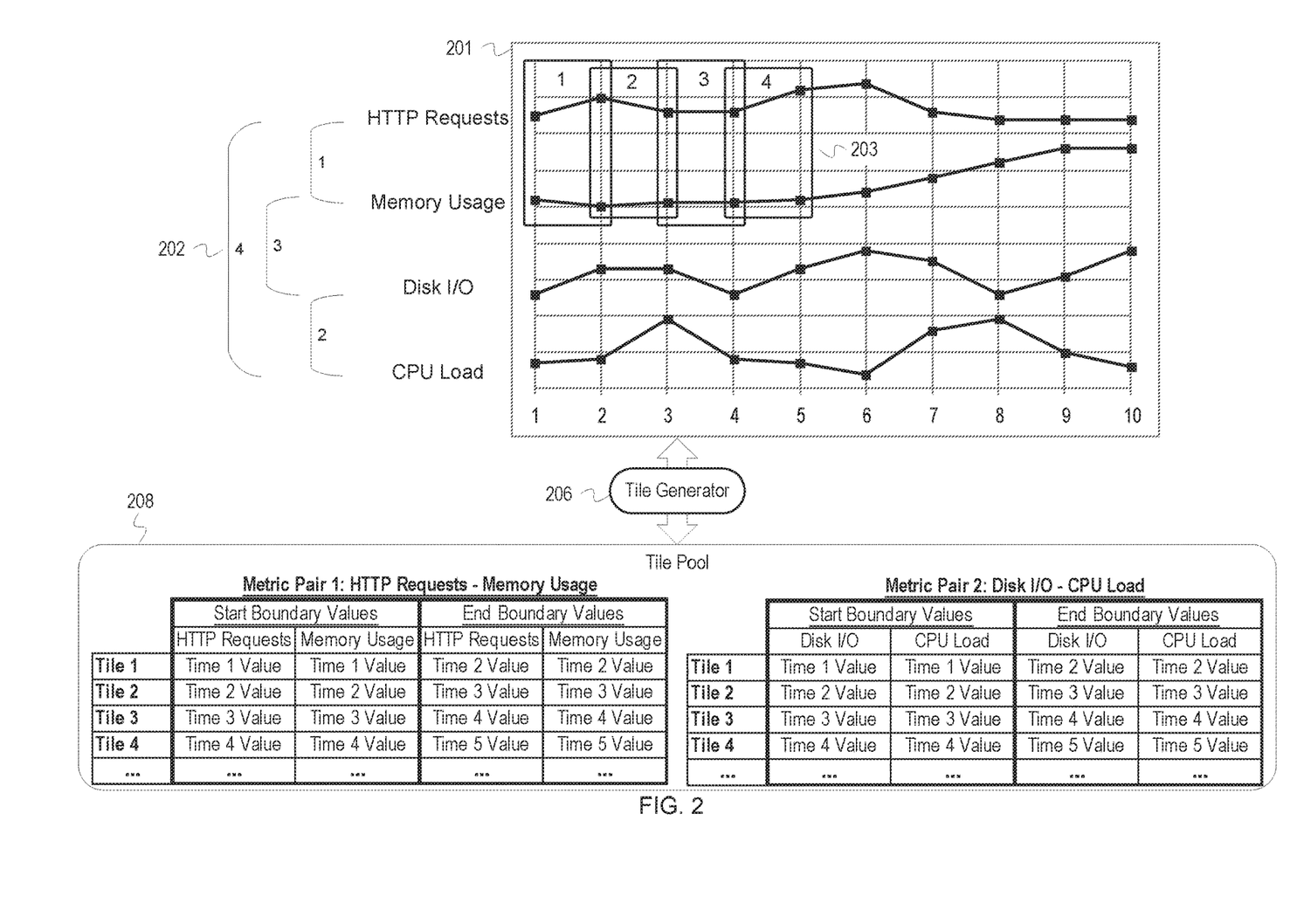
FIG. 2 depicts an example tile generator which generates tiles based on metric data for an application instance.

FIG. 2 depicts an example tile generator which generates tiles based on metric data for an application instance. FIG. 2 depicts a tile generator 206 which generates and stores tiles in a tile pool 208. The tile generator 206 generates tiles based on received metric data 201.

The metric data 201 includes metric measurements collected from a single application instance. The metrics include HTTP requests, memory usage, disk I/O and CPU load each with measurements collected at times 1-10. The time instances 1-10 also represent the boundaries of slices or segments to be used for generating tiles. The tile generator 206 may be configured with a segment size of 5 seconds and divide the metric data 201 accordingly beginning from time 1, resulting in 5-second slices from times 1-2, 2-3, 3-4, etc. In some instances, measurements for each of the metrics may not have been sampled or collected at times corresponding to the slice boundaries. The CPU load metric, for example, may have been measured at a time of 1 minute and 10 seconds, and the memory usage may have been measured at a time of 1 minute and 11 seconds. The tile generator 206 may shift the measurements so that the measurements align at the slices boundaries at time instances 1-10. Additionally, measurements may be collected at different frequencies, such as every 10 seconds for disk I/O versus every 20 seconds for HTTP requests. If a slice size is selected to be 10 seconds, the tile generator 206 may use interpolation on the disk I/O measurements to determine metric values at 10 second intervals between each of the 20 second measurements for the disk I/O metric.

FIG. 2 also depicts metric pairs 202. Metrics may be grouped or paired so that a tile includes boundary values from multiple metrics for a given slice. Grouping the metrics improves the anomaly detection process by ensuring that a tile series cannot be easily reconstructed and providing context for metric measurements. For example, a high CPU load metric value may seem normal in isolation; however, when considered in context, such as when paired with a low HTTP requests metric value, it can become apparent that the CPU load metric should not be high considering the few requests. During the reconstruction process, a tile that has a high CPU load value paired with a low HTTP request value will likely not be found thus allowing the anomaly to be discovered; whereas, if the CPU load metric was not paired, a tile with a high CPU load metric would likely still be found. The metric pairs 202 include four overlapping pairs of metrics: (1) HTTP requests and memory usage, (2) disk I/O and CPU load, (3) memory usage and disk I/O, and (4) HTTP requests and CPU load. Other pairings or groupings of metrics are possible. For example, additional pairs of metrics may be added so that all possible combination of metrics pairs are represented. Additionally, the tile generator 206 may generate tiles of various group sizes, e.g. some tiles based on metric pairs, some tiles based on a trio of metrics, etc.

The tile generator 206 generates tiles by identifying values for each of the metric pairs 202 at the boundaries of the segments. The tile pool 208 in FIG. 2 depicts example tiles for the first two metric pairs 202 of HTTP requests-memory usage and disk I/O-CPU load. The table titled "Metric Pair 1" in the tile pool 108 shows four tiles generated based on the pairing of HTTP requests and memory usage metrics. As shown in the table, each tile includes values for the metrics at time instances corresponding to the segment boundaries. Tile 1, for example, includes start boundary values for HTTP requests and memory usage at time 1 and end boundary values for HTTP requests and memory usage at time 2. Tile 2 continues with start boundary values from time 2 and end boundary values from time 3. The tiles 1-4 are graphically illustrated for explanation purposes by the example tiles 203. The values included in each tile are outlined by the rectangles of the example tiles 203. The tile pool 108 includes a depiction of a table for the "Metric Pair 2" with tiles that contain values of the disk I/O and CPU load metrics. Although not depicted, the tile generator 206 creates similar tables for the other metric pairs in the metric pairs 202.

For simplicity, FIG. 2 depicts metric data 201 for a single application instance. Metric data for other application instances may be collected over a same time period, and the tile generator 206 can similarly generate tiles using a same segment size and the same metric pairs 202 or grouping scheme for the metric data of each application instance. For example, a system may include 100 instances of a same application which causes 100 sets of metric data to be collected and 100 sets of tiles to be generated. When storing a tile in a tile pool, the tile generator 206 may determine if an identical tile is already stored to avoid storing duplicate tiles. If an identical tile is already stored, the tile generator 206 can associate the existing tile with an identifier for the additional application instance so that the tile is associated with identifiers for each application instance which experienced the same metric data. The tile generator 206 may, for example, append the identifier to a list of application instance identifiers in an entry for the tile in the tile pool 208. Additionally, each of the tiles may be associated with a timestamp or a slice identifier so that the time at which the tile occurred or tiles from a same slice can be identified or queried.

Figure 3:
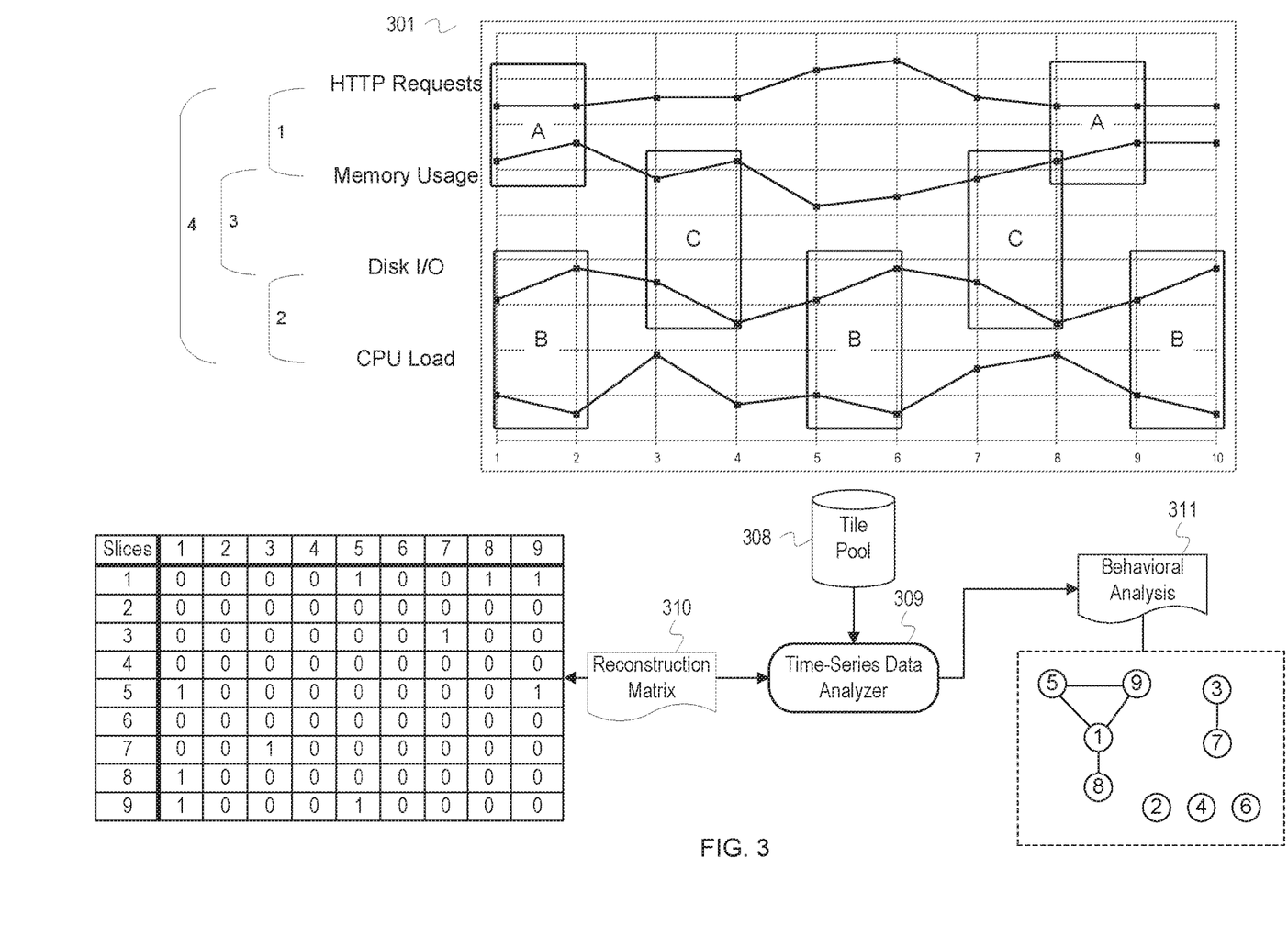
FIG. 3 depicts an example time-series data analyzer which identifies behaviors in time-series data for an application instance.

FIG. 3 depicts an example time-series data analyzer which identifies behaviors in time-series data for an application instance. FIG. 3 depicts a time-series data analyzer 309 which retrieves tiles from a tile pool 308 for analysis of time-series data 301 of an application instance. The tile pool 308 includes tiles generated based on time-series metric data 301 in a manner similar to that described in FIG. 2. The data analyzer 309 may have retrieved the time-series data 301 from the tile pool 308 or from a database of application instance metrics. For example, the data analyzer 309 may have queried the tile pool 308 to retrieve the five most recent tiles for the application instance and compiled the time-series metric data 301.

The data analyzer 309 analyzes each slice of the metric data 301 to determine whether any tile within a slice matches a tile from the other slices. The metric data 301 is sliced according to a same time window used for generation of tiles in the tile pool 308. For example, the metric data 301 may be sliced and the tiles generated based on 2 second intervals. In FIG. 3, the metric data 301 includes 9 slices: slice 1 from interval 1-2, slice 2 from interval 2-3, slice 3 from interval 3-4, etc. As part of the analysis, the data analyzer 309 may create a reconstruction matrix 310 which indicates which slices include tiles that match or can be rebuilt using tiles of other slices. The rows and columns of the reconstruction matrix 310 represent each of the slices. A 0 in the matrix 310 indicates that the slices do not have any matching tiles, and a 1 in the matrix 310 indicates that the slices have at least one matching tile.

The data analyzer 309 may determine which slices share matching tiles by selecting the first slice (slice 1 from interval 1-2) and determining whether tiles from the other slices match tiles in slice 1. In FIG. 3, each slice of the metric data 301 includes four tiles based on the four combinations of metric types depicted. The data analyzer 309 compares each tile to tiles comprising the same metric types in the other slices. Based on this comparison, the data analyzer 309 determines that the slice 1 tile comprising HTTP Requests/ Memory Usage metrics matches a tile from slice 8. This match is indicated by the rectangles labeled with the letter A. Based on this match, the data analyzer 309 adds a 1 to the matrix 310 for column 1, row 8 and a 1 for column 8, row 1 to indicate that tile from slice 8 can be used to rebuild a tile from slice 1 and vice versa. The data analyzer 309 continues the analysis of slice 1 and determines that the tile based on Disk I/O/CPU load matches tiles from slice 5 and slice 9. The data analyzer 309 updates the matrix 310 accordingly to indicate the matches. After checking the other tile types in slice 1, the data analyzer 309 continues with slice 2 and determines that no other tiles match the tiles in slice 2. As a result, the row and column for slice 2 in the matrix 310 includes only 0's indicating no matches. The data analyzer 309 continues with slice 3 and determines that the tile based on Memory Usage/Disk I/O matches a tile from slice 7. The data analyzer 309 updates the matrix 301 for slices 3 and 7 accordingly. The data analyzer 309 continues analyzing the metric data 301 in this manner until all possible tile matches have been identified.

After identifying slices with matching tiles, the data analyzer 309 generates a behavioral analysis 311. In FIG. 3, the behavioral analysis 311 includes a graph data structure which identifies clusters of slices as well as unique or non-clustered slices. The data analyzer 309 can generate the graph data structure using the reconstruction matrix 310 by creating nodes for each of the slices and adding an edge between slice nodes for each 1 indicated in the matrix 310. The graph data structure includes clusters or highly connected subgraphs of segments, such as the cluster of segments 1, 5, and 9. In some instances, the connected segments 1 and 8 and segments 3 and 7 may also be identified as clusters. From this graph data structure in the behavioral analysis 311 and from the matrix 310, a number features or behaviors of an application instance, the periodicity or frequency of behaviors, and a topological structure decomposition of application instance behaviors can be efficiently determined. For example, frequency of a behavior in a segment can be determined by analyzing the rows or columns of the matrix 310 and identifying 1's or other indication in the matrix entries that the behavior has occurred. Analyzing column 1 or row 1 indicates that the behaviors in segment 1 occur three times over the time period represented by the nine segments. In some instances, patterns in the matrix 310 can be identified (such as consistently repeated 1s) which indicates some level of periodicity to the experienced behaviors. Additionally, these data structures allow for an approximation of a Fourier transform for application behaviors by indicating how prominent each behavior is within the operation of an application instance. Moreover, as additional metric data is received, it can be determined whether the new metric data conforms to the existing slice clusters. If new metric data leads to the generation of an additional cluster(s), this can indicate that the application instance is experiencing new behaviors which may be anomalous or non-optimal for the application instance.

The matrix 310 includes a 1 in a matrix entry if there is a match of any tile in the corresponding slices. The data analyzer 309 can also generate matrices for each tile type/ pairing, such as HTTP Requests/Memory Usage, or for individual metrics such as CPU Load. A matrix based on a specified metric can be used to identify behaviors of a specific metrics such as CPU Load, or a matrix based on a specified tile pairing can be used to identify how closely correlated those metric behaviors are, such as HTTP Requests and Disk I/O. If a matrix for a metric pair indicates a high number of related slices, then these metrics are presumably closely correlated; whereas, a low number of related slices indicates low correlation. Additionally, the graph data structure in the behavioral analysis 311 can include metric data for clusters or can mark edges connecting the nodes with which metrics or tile types were a match between the slices. For example, for the cluster of slices 1, 5, and 9, the cluster may be marked to show that the segments share Disk I/O and CPU load metric values and may also show the shared metric value for each metric.

In the tile matching process described above, tiles may be matched based exact matches of metric values at the boundaries of the slices; however, in some implementations, values within a threshold difference, e.g. plus or minus five, may be deemed a match. Moreover, in some implementations, temporal constraints may be applied in addition to the metric value matching. For example, a tile may only be considered a match if it occurs within a threshold time from the currently selected tile, e.g. within 5 minutes of the selected tile.

The computational efficiency of the tile matching process can be improved in a variety of ways. Index structures for searching the tile pool 308 may be generated. For example, one or more binary search trees or B-trees which use the metric values as keys can improve the time in which tiles with at least one matching metric value are found. Additionally, the metric values in a tile may be combined and hashed or fingerprinted before being added to the tile pool 308. In such an implementation, the data analyzer 309 may hash metric values for the tiles and search the tile pool 308 using the hash. Furthermore, Bloom filters may be used to determine whether a tile exist in the tile pool 308. The fact that Bloom filters give false positives may be ignored in instances where a "best-effort" reconstruction or matching is sufficient.

Figure 4:
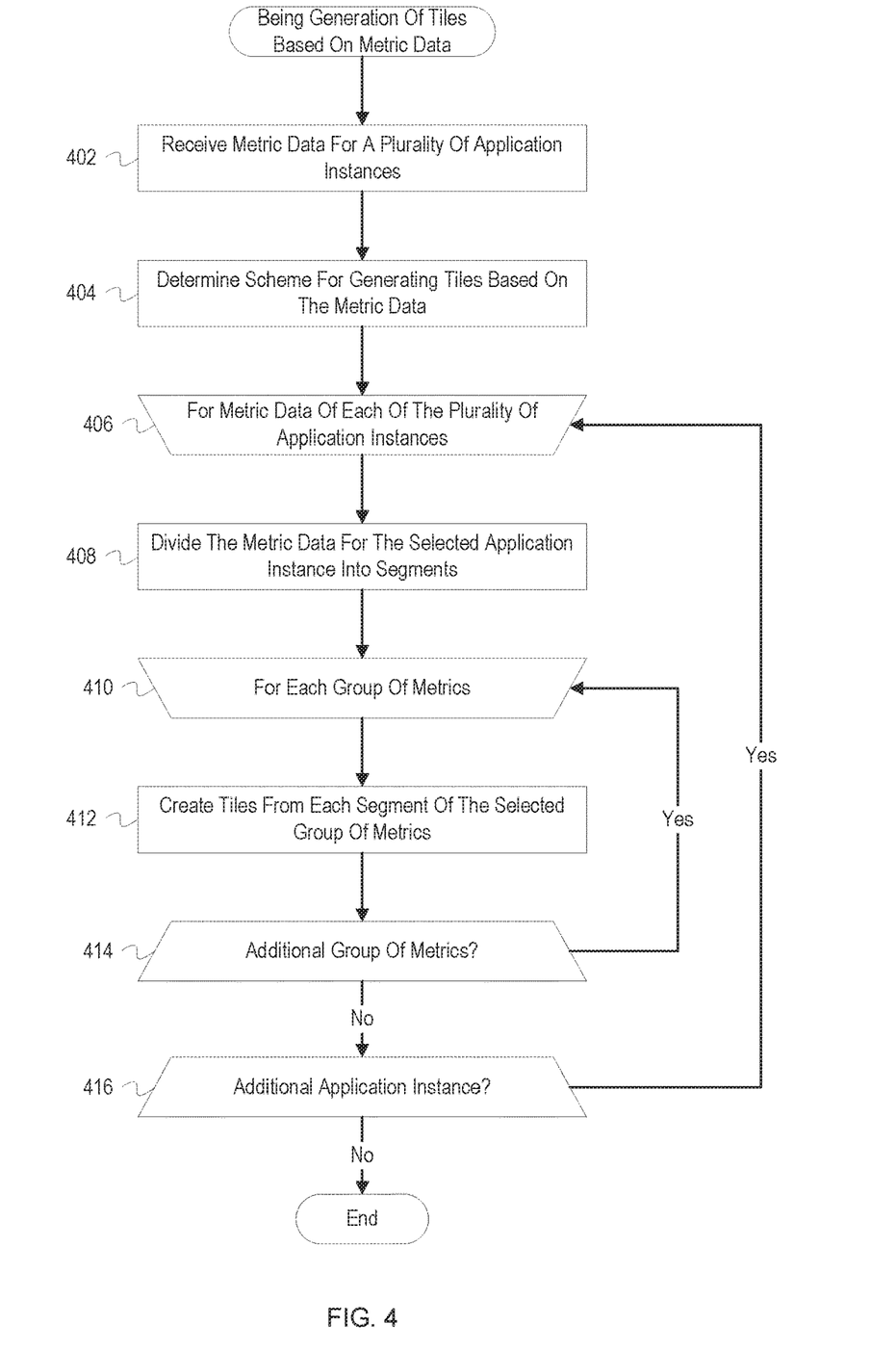
FIG. 4 depicts example operations for generating tiles based on metric data of application instances.

FIG. 4 depicts example operations for generating tiles based on metric data of application instances. FIG. 4 refers to an application behavioral analysis system as performing the operations for naming consistency with FIG. 1, although naming of software and program code can vary among implementations.

An application behavioral analysis system ("system") receives metric data corresponding to a plurality of application instances (401). The system can obtain the metric data by polling the application instances, subscribing to metric data updates from a monitoring service, querying a metric data database, etc. The system can be configured to retrieve specified types of metrics which may be conducive to detecting anomalies. Additionally, the system may be configured to sample metric data at periodic intervals. For example, the system may retrieve a previous 20 seconds of metric data every minute.

The system determines a scheme for generating tiles based on the metric data (404). A tile scheme includes parameters for slicing/segmenting the metric data and grouping metric data. The system may be configured with a tile scheme which indicates a segment size, e.g. 3 seconds or every 5 data points, and specifies metric groupings, e.g. specific pairs or trios of metrics. The system can also determine a segment size based on a sample rate of the metric data. For example, if metrics are recorded at 2 second intervals, the system may double the sample rate and determine that a 4 second segment size should be used. Similarly, for metric groupings, the system can determine a grouping size based on a number of available metric types. For example, if there is a relatively larger number of metrics, the system may use a larger group size, e.g. groups of 5 metrics. After a tile scheme is determined, the system stores the parameters so that future tile generation is consistent with the determined parameters.

The system begins processing metric data for each of the plurality of application instances (406). The system iterates through the metric data for each of the application instances. The application instance whose metric data is currently being processed is hereinafter referred to as "the selected application instance."

The system divides the metric data for the selected application instance into segments (408). The system slices or segments the metric data in accordance with the determined segment size. Segmenting the metric data involves determining time values for the boundaries of the segments. The system can determine a starting time for the metric data as a first boundary and determine subsequent boundaries based on the segment size. For example, if a first metric value is recorded at a time of 1 minute and 30 seconds, the next boundary may be located at a time of 1 minutes and 35 seconds if the segment size is 5 seconds. Other techniques for segmenting the metric data may be possible depending on a format or structure of the metric data. For example, if the metric data is in a multi-dimensional array, the segment boundaries can be indicated using indexes of the array, e.g. 0, 5, 10, etc. The system may create a list of time values or other indications of the segment boundaries. Also, as part of segmenting the metric data, the system may time shift data for one or more of the metrics so that recorded metric values align at boundaries of the segments.

The system begins generating tiles for each group of metrics in the metric data of the selected application instance (410). The system iterates through each grouping of metrics determined at block 404. The group of metrics for which tiles are currently being generated is hereinafter referred to as "the selected group of metrics."

The system creates tiles from each segment of the selected group of metrics (412). The system captures values for each metric in the selected group of metrics at start and end boundaries of each segment. The boundary values for each of the segments are stored as tiles along with identifiers for the selected application instance, identifiers for the metrics in the selected group of metrics, a timestamp, and an identifier for the corresponding segment of the tile. In some implementations, the tiles may also be associated with a timestamp. If the tile pool is a relational database, tiles for the selected group of metrics may be stored in their own table in which tiles generated for the selected group of metrics across the plurality of application instances are stored. If the tile pool is a collection of hash values or a fingerprint database, the system may hash the tile prior to storage.

The system determines whether there is an additional group of metrics (414). If there is an additional group of metrics, the system selects the next group of metrics (410).

If there is not an additional group of metrics, the system determines whether there is an additional application instance (416). If there is an additional application instance, the system selects the next application instance (406). If there is not an additional application instance, the process ends.

The above operations of FIG. 4 may be triggered each time new metric data is received for one or more of the plurality of application instances. To ensure space for new tiles, the system may keep generated tiles in a tile pool for a specified retention period. For example, tiles corresponding to metric data older than 24 hours may be purged from the tile pool.

Figure 5:
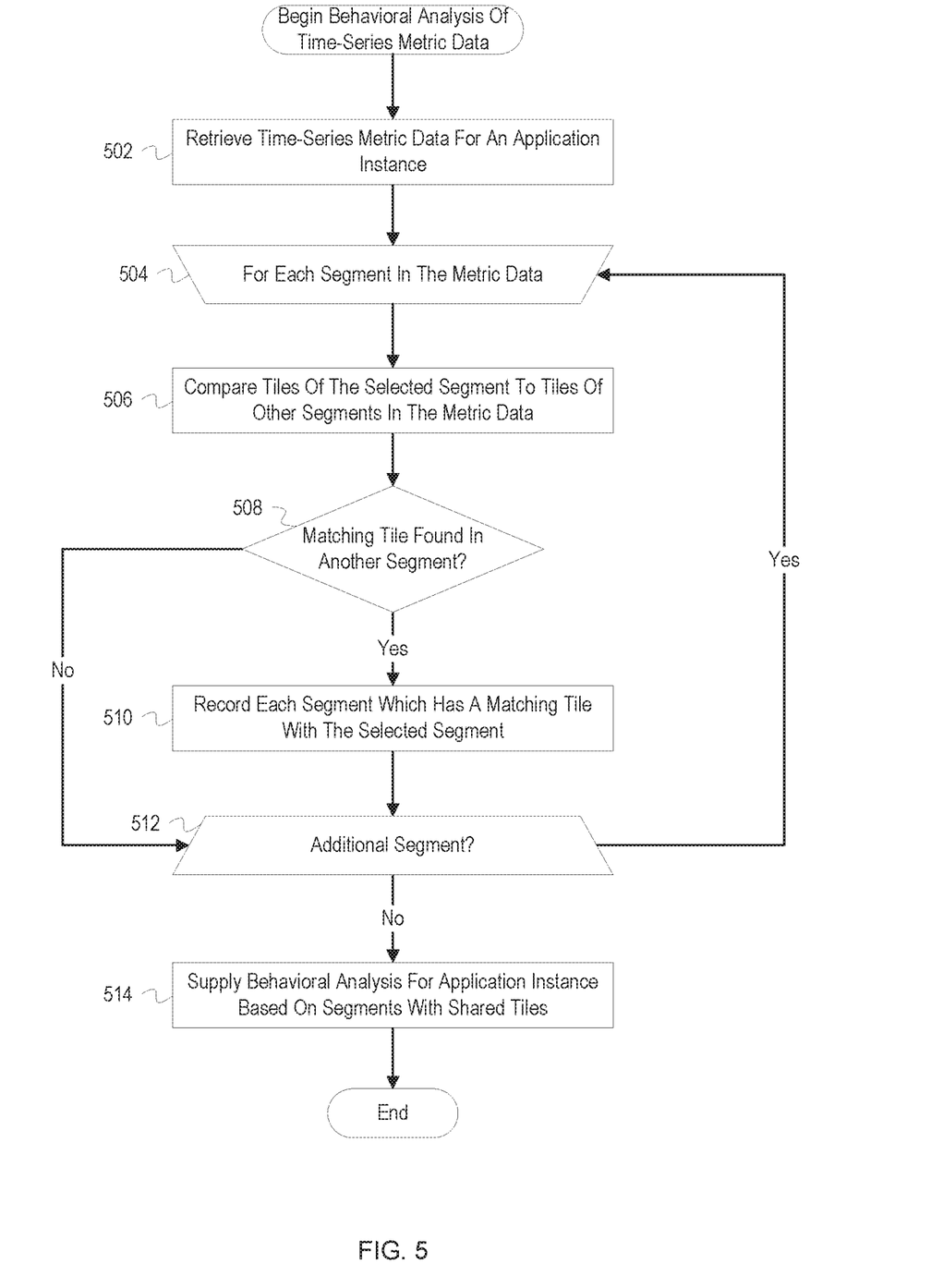
FIG. 5 depicts example operations for behavioral analysis of time-series metric data for an application instance.

FIG. 5 depicts example operations for behavioral analysis of time-series metric data for an application instance. FIG. 5 refers to an application behavioral analysis system as performing the operations for naming consistency with FIG. 1, although naming of software and program code can vary among implementations.

An application behavioral analysis system ("system") retrieves time-series metric data for an application instance (502). The system can retrieve metric data for a specified time interval, e.g. last 10 seconds, or retrieve a specified amount of metric data, e.g. 10 megabytes, previous 20 measurements, 50 tiles, etc. If tiles for the metric data of the selected application instance have been generated, the system can retrieve tiles for the selected application instance from a tile pool. When retrieving the tiles, the system retrieves a number of time-sequential tiles for the application instance from each available group of metrics. For example, if the system is configured to retrieve 10 seconds of metric data, the system retrieves a number of tiles constituting 10 seconds of metric data from each set of tiles based on different metric groupings, i.e. the determined number of tiles are retrieved from a CPU load-memory usage metric group and also from a disk I/O-HTTP requests group. If tiles for the metric data have not been generated, the system may retrieve the metric data by polling the application instance or querying a metric database/log. The system then generates tiles based on the metric data using a same tile scheme as was used to generate tiles in the tile pool. In either instance, the retrieval of time-series metric data results in metric data comprising sets of time-sequential tiles corresponding to the specified groups of metrics. Tiles are generated based on a configured slice or segment size, such as 2 seconds. The system organizes tiles into their corresponding segment based on a segment label or timestamp associated with the tiles.

The system begins analysis for each segment of the time-series metric data (504). The system iterates through each segment and its corresponding tiles. The segment which the system is currently analyzing is hereinafter referred to as "the selected segment."

The system compares tiles of the selected segment to tiles of other segments in the metric data (506). If the tiles are stored in a database, the system may construct a query using metric values for each tile of the selected segment and execute the queries on a database table comprising tiles for the application instance. The query is constructed to exclude tiles from the selected segment and may also be configured to only include tiles generated after a timestamp associated with the selected segment and its tiles. If the tiles for the other segments are stored in an array or other data structure, the system may iterate through the array comparing a first metric value from each tile of the selected segment to first metric values of tiles of the other segments and then comparing the other metric values upon detecting a match of the first metric value.

The system determines whether a matching tile was found in another segment (508). Two tiles are a match if the metric values at the boundaries of the tiles are the same or within a threshold difference. If a matching tile was found in one or more other segments, this indicates that the selected segment shares some behaviors with the other segments containing the matching tiles.

If a matching tile was found in one or more other segments, the system records each segment which has a matching tile with the selected segment (510). The system may record which segments share matching tiles by updating a matrix, creating an edge between nodes representing the segments in a graph data structure, or otherwise creating a mapping or indicating a link/relationship between the segments. In some implementations, the system may also record which specific tiles were shared or which metric type(s) were matching between the segments.

After recording a segment with a matching tile or after determining that no matching tile for the selected segment was found, the system determines whether there is an additional segment in the time-series metric data (512). If there is an additional segment, the system selects the next segment (504).

If there is not an additional segment, the system supplies a behavioral analysis for the application instance based on the recorded segments with shared tiles (514). The system may supply the behavioral analysis in the form of a matrix or graph data structure which indicates the related segments. The different clusters of segments in a graph data structure can indicate the number and prevalence of behaviors for the application instance. For example, a cluster of 100 segments indicates a more common behavior relative to a cluster of 3 segments. The system can identify clusters using clustering or community detection algorithms such as the Highly Connected Subgraphs (HCS) clustering algorithm or the Markov clustering algorithm. The system can determine a rate of occurrence or a percentage for each behavior based on the relative cluster sizes. Additionally, the system may characterize the behavior for each cluster based on the metric data of the related segments. For example, the system may average the values for metric types such as CPU load and memory usage for a cluster. Based on these average values for each cluster, an administrator can generally estimate how frequently each of those metric values are experienced based on the size of a cluster associated with the values. For example, if a large cluster indicates that the application instance frequently encounters high memory usage, an administrator can identify this high frequency behavior from the segment clusters and decide to allocate more memory to the application instance. Related segments and associated metric data can also be displayed in other formats such as histograms, bar charts, line graphs, pie charts, etc. After supplying the behavioral analysis for the application instance, the process ends until additional metric data is received.

Figure 6:
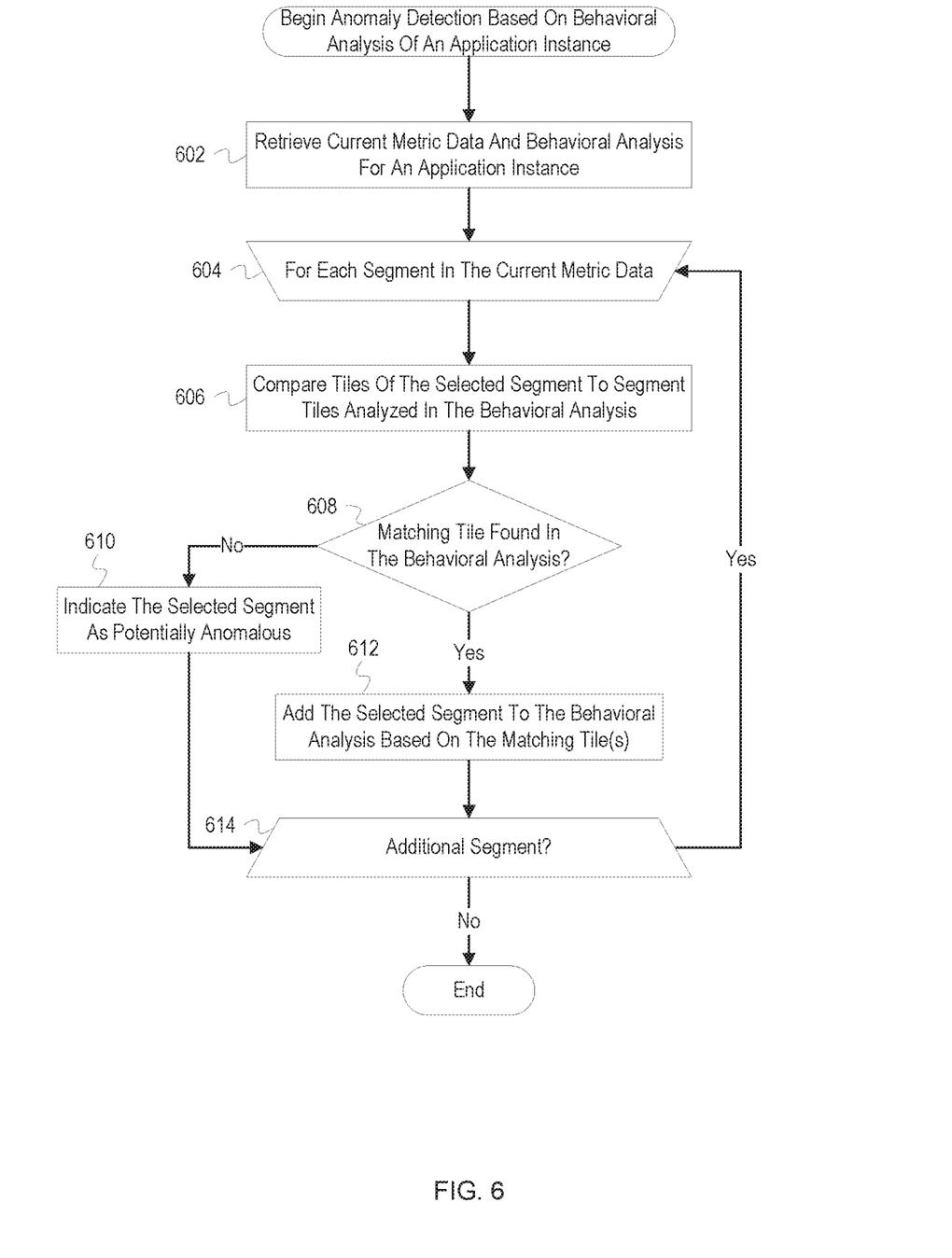
FIG. 6 depicts example operations for anomaly detection based on a behavioral analysis of an application instance.

FIG. 6 depicts example operations for anomaly detection based on a behavioral analysis of an application instance. FIG. 6 refers to an application behavioral analysis system as performing the operations for naming consistency with FIG. 1, although naming of software and program code can vary among implementations.

An application behavioral analysis system ("system") retrieves current metric data and a behavioral analysis for an application instance (602). The system retrieves time-series metric data in a manner similar to that described at block 502 of FIG. 5; however, the current metric data is data that was collected for the application instance from a time period after the metric data used for generation of the behavioral analysis. The system may have generated the behavioral analysis in a manner similar to that described in FIG. 5. The behavioral analysis may include a matrix of graph data structure representing segments of the previously analyzed metric data.

The system begins analysis for each segment of the current time-series metric data (604). The system iterates through each segment and its corresponding tiles. The segment which the system is currently analyzing is hereinafter referred to as "the selected segment."

The system compares tiles of the selected segment to tiles of segments analyzed in the behavioral analysis for the application instance (606). The system compares tiles in a manner similar to that described at block 506 of FIG. 5. The system may first retrieve tiles for each of the segments represented in the behavioral analysis from a tile pool or other tile storage. By comparing the tiles to the tiles of segments in the behavioral analysis, the system can determine whether the tiles in the selected segment contain metric data that is exhibits behaviors similar to the previously analyzed metric data.

The system determines whether a matching tile was found in another segment (608). If a matching tile was found in one or more segments of the behavioral analysis, this indicates that the selected segment shares some behaviors with the other segments containing the matching tiles.

If a matching tile was not found, the system indicates the selected segment as potentially anomalous (610). Because no tiles in the selected segment matched previously encountered behaviors, the system determines that the metric data in the segment could be indicative of an issue with the application instance. The system may supply the metric data to monitoring software or otherwise trigger a warning or alert. In some implementations, the system may perform additional processing of the tiles in the segment to determine whether they are anomalous. For example, the system may compare metric values in the tiles to thresholds and generate an alert if the values exceed the thresholds. The thresholds may be set based on metric values of large clusters in the behavioral analysis. For example, a CPU load threshold may be set according to the average CPU load value associated with segments of a largest cluster in the behavioral analysis. Since large clusters indicate common or typical behaviors of the application instance, the metric values associated with the large clusters are likely good indicators of what values an application instance should be experiencing and therefore may be used to set thresholds for expected or normal behavior.

If a matching tile was found in one or more segments of the behavioral analysis, the system adds the selected segment to the behavioral analysis based on the matching tile(s) (612). The system adds the selected segment to the behavioral analysis so that the behavioral analysis remains updated with current metric data from the application instance. To add the selected segment to the behavioral analysis, the system may add a column and row to a matrix or add a node for the selected segment to a graph data structure. The system also updates the matrix or graph data structure to reflect the segments which share matching tiles with the selected segment. In some implementations, the behavioral analysis may include segments or metric data which are known to be or have been flagged/marked as anomalous. If tiles from the selected segment matched with one of the anomalous segments, the system may generate an alert or notify monitoring software that the application instance is behaving anomalously.

After recording a segment with a matching tile or after determining that no matching tile for the selected segment was found, the system determines whether there is an additional segment in the time-series metric data (614). If there is an additional segment, the system selects the next segment (604). If there is not an additional segment, the process ends until additional metric data is retrieved.

The operations of FIGS. 5 and 6 can be repeated for each application instance executing in a system. For example, if 10 application instances are executing, the operations may be performed 10 times at varying intervals. In some implementations, the behavioral analysis for the application instances may be compared to determine whether the instances are behaving similarly. For example, if one application instance has a prevalent behavior not found in the behavioral analysis of the other application instances, the system can determine that the application instance is behaving anomalously.

Variations

FIG. 1 is annotated with a series of letters A-D. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 408 and 412 of FIG. 4 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

Some operations above iterate through sets of items, such as metric data for application instances, groups of metrics, tiles, segments, etc. In some implementations, items may be iterated over according to an ordering of the items, an indication of item importance, an item's timestamp, etc. Also, the number of iterations for loop operations may vary. Different techniques for processing the items may require fewer iterations or more iterations. For example, multiple items may be processed in parallel. Additionally, in some instances, not all items may be processed. For example, for application instances, only a number of application instances may be monitored at each monitoring interval. Ten application instances from a plurality of application instances may be randomly selected at a first execution of the anomaly detection process, and another ten application instances may be subsequently, e.g. 1 minute later, selected for anomaly detection.

The above operations focus on analyzing metric data collected from the application instances; however, similar operations can be applied to analyzing other components within the system, such as servers, operating systems, storage devices, etc. For example, if the application instances execute across multiple hypervisors, the anomaly detection system can also collect metric data from each of the hypervisors and similarly perform anomaly detection for the hypervisors as if they were application instances. The term "component" as used herein encompasses both hardware and software resources. The term component may refer to a physical device such as a computer, server, router, etc.; a virtualized device such as a virtual machine or virtualized network function; or software such as an application, a process of an application, database management system, etc. A component may include other components. For example, a server component may include a web service component which includes a web application component.

In FIG. 1, the application instances 102 are depicted as being comprised of a single module or container. However, the application instances 102 may each comprise a group/pod of containers running services of the overall application. Additionally, the application instances 102 may be distributed across multiple service infrastructures from which the service monitor 103 collects metric data. In some implementations, the application behavioral analysis system 105 may be part of the service monitor 103 or may communicate directly with the service infrastructure(s) to retrieve metric data for application instances.

When retrieving metric data for an application instance(s) over a time period, the anomaly detection system may specify whether the time period indicates a real-time period or a time period based on a run-time of the application instance(s). A real-time period is a time period corresponding to a time of day, such as 10:05 A.M. to 10:10 A.M., and a run-time period corresponds to a time period relative to when an application instance began execution. For example, a run-time for the tenth minute of an application instance's execution time may be specified as 00:09:00-00:10:00, assuming the starting time was 00:00:00. Since the application instances may begin execution at different times of the day, requesting data from a run-time period results in metric data from different real-time periods across the application instances. Metric data from run-time periods may be useful for analyzing certain metrics, such as an application instance's memory usage after one hour of executing. When attempting reconstruction of time-series data, the system may limit the tile pool to tiles which include metric values collected within a same run-time period as the time-series data.

The variations described above do not encompass all possible variations, implementations, or embodiments of the present disclosure. Other variations, modifications, additions, and improvements are possible.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 7:
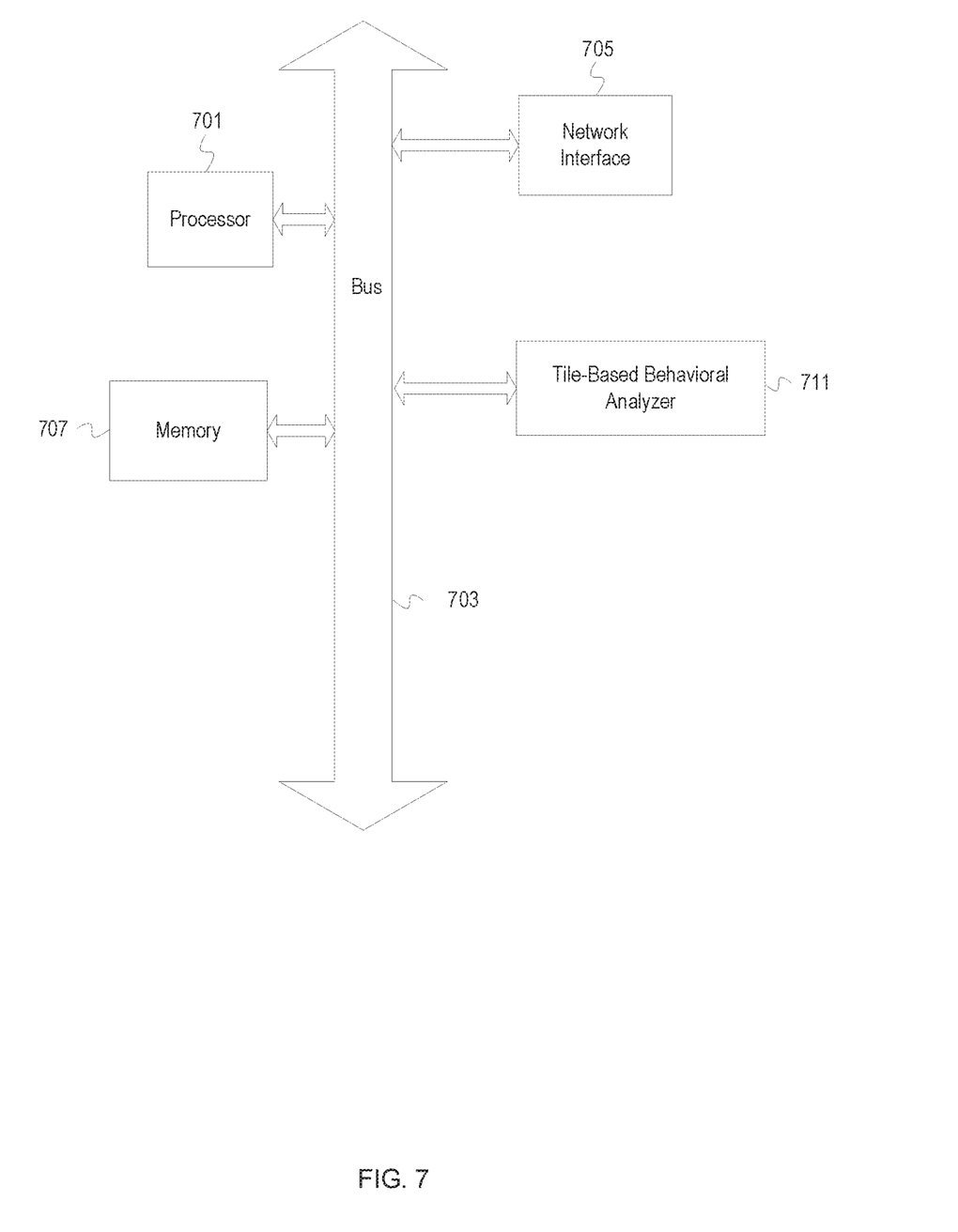
FIG. 7 depicts an example computer system with a tile-based behavioral analyzer.

FIG. 7 depicts an example computer system with a tile-based behavioral analyzer. The computer system includes a processor unit 701 (possibly including multiple processors, multiple cores, multiple nodes, and/or implementing multi-threading, etc.). The computer system includes memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 703 (e.g., PCI, ISA, PCI-Express, HyperTransport® bus, InfiniBand® bus, NuBus, etc.) and a network interface 705 (e.g., a Fiber Channel interface, an Ethernet interface, an internet small computer system interface, SONET interface, wireless interface, etc.). The system also includes a tile-based behavioral analyzer 711. The tile-based behavioral analyzer 711 efficiently determines application instance behaviors and can detects anomalies among application instances based on analysis of time-series metric data. Any one of the previously described functionalities may be partially (or entirely) implemented in hardware and/or on the processor unit 701. For example, the functionality may be implemented with an application specific integrated circuit, in logic implemented in the processor unit 701, in a co-processor on a peripheral device or card, etc. Further, realizations may include fewer or additional components not illustrated in FIG. 7 (e.g., video cards, audio cards, additional network interfaces, peripheral devices, etc.). The processor unit 701 and the network interface 705 are coupled to the bus 703. Although illustrated as being coupled to the bus 703, the memory 707 may be coupled to the processor unit 701.

While the aspects of the disclosure are described with reference to various implementations and exploitations, it will be understood that these aspects are illustrative and that the scope of the claims is not limited to them. In general, techniques for behavioral analysis of time-series metric data as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

This description uses shorthand terms related to cloud technology for efficiency and ease of explanation. When referring to "a cloud," this description is referring to the resources of a cloud service provider. For instance, a cloud can encompass the servers, virtual machines, and storage devices of a cloud service provider. The term "cloud destination" and "cloud source" refer to an entity that has a network address that can be used as an endpoint for a network connection. The entity may be a physical device (e.g., a server) or may be a virtual entity (e.g., virtual server or virtual storage device). In more general terms, a cloud service provider resource accessible to customers is a resource owned/manage by the cloud service provider entity that is accessible via network connections. Often, the access is in accordance with an application programming interface or software development kit provided by the cloud service provider.

This description uses the term "data stream" to refer to a unidirectional stream of data flowing over a data connection between two entities in a session. The entities in the session may be interfaces, services, etc. The elements of the data stream will vary in size and formatting depending upon the entities communicating with the session. Although the data stream elements will be segmented/divided according to the protocol supporting the session, the entities may be handling the data at an operating system perspective and the data stream elements may be data blocks from that operating system perspective. The data stream is a "stream" because a data set (e.g., a volume or directory) is serialized at the source for streaming to a destination. Serialization of the data stream elements allows for reconstruction of the data set. The data stream is characterized as "flowing" over a data connection because the data stream elements are continuously transmitted from the source until completion or an interruption. The data connection over which the data stream flows is a logical construct that represents the endpoints that define the data connection. The endpoints can be represented with logical data structures that can be referred to as interfaces. A session is an abstraction of one or more connections. A session may be, for example, a data connection and a management connection. A management connection is a connection that carries management messages for changing state of services associated with the session.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
   gathering, by a first processor of a computing device, first data measured during execution of an application by another computing device in communication with the computing device, the first data comprising time-series measurements related to operation of a second processor of the another computing device, a second memory of the another computing device, or a second disk interface of the another computing device;
   generating, by the first processor, one or more tiles for each of a plurality of segments of the first data;
   determining, by the first processor, that a first tile for a first segment of the plurality of segments matches a second tile of a second segment of the plurality of segments; and
   based on determining that the first tile matches the second tile of the second segment of the plurality of segments, indicating, by the first processor, a relationship between the first segment and the second segment;
   generating, by the first processor, a behavioral analysis for the application based, at least in part, on the relationship between the first segment and the second segment;
   comparing, by the first processor, a third segment of second data collected from the application to segments included in the behavioral analysis; and
   based on determining that no tiles of the third segment match tiles of segments included in the behavioral analysis, indicating, by the first processor, that the application is experiencing an anomaly.

2. The method of claim 1 further comprising:
   comparing a fourth segment of second data collected from the application to segments included in the behavioral analysis; and
   based on determining that a third tile of the fourth segment matches a fourth tile of a fifth segment included in the behavioral analysis, determining whether the fifth segment is related to other segments in the behavioral analysis; and either:
      based on determining that the fifth segment is not related to other segments in the behavioral analysis, indicating that the application is experiencing an anomaly, or
      based on determining that the fifth segment is related to other segments in the behavioral analysis, adding the third segment to a cluster of segments comprising the fifth segment in the behavioral analysis.

3. The method of claim 1, wherein indicating the relationship between the first segment and the second segment comprises updating an entry in a matrix corresponding to the first segment and the second segment.

4. The method of claim 3, wherein generating the behavioral analysis for the application based, at least in part, on the relationship between the first segment and the second segment comprises:
   determining a time between the first segment and the second segment; and
   indicating in the behavioral analysis that data of the first segment related to the operation of the application occurs at a frequency based on the time.

5. The method of claim 1, wherein generating the behavioral analysis of the application based, at least in part, on the relationship between the first segment and the second segment comprises:
   generating a first node for the first segment and a second node for the second segment in a graph data structure; and
   creating an edge between the first node and the second node.

6. The method of claim 5 further comprising:
   averaging values for each type of time-series measurements corresponding to the first and second segments; and
   displaying the averaged values in association with the first and second node of the graph data structure.

7. The method of claim 1, wherein generating the one or more tiles for each of the plurality of segments of the first data collected from the application comprises:
   dividing the time-series measurements in the first data related to the application into the plurality of segments, wherein each of the plurality of segments corresponds to a time period of the time-series measurements; and
   for each segment of the plurality of segments,
      determining values of one or more of the time-series measurements indicated at boundaries of the segment; and
      storing the values as a tile.

8. The method of claim 7, wherein dividing the time-series measurements in the first data related to the application into a plurality of segments comprises at least one of:
   determining boundaries for each segment in the time-series measurements based on a time interval; and
   determining boundaries for each segment of the plurality of segments to be located at every specified number of measurements in the time-series measurements.

9. An apparatus comprising:
   a processor; and
   a computer-readable medium having instructions executable by the processor to cause the apparatus to,
      gather first data measured during execution of an application by another apparatus in communication with the apparatus, the first data comprising time-series measurements related to operation of a second processor of the another apparatus, a second memory of the another apparatus, or a second disk interface of the another apparatus;
      generate one or more tiles for each of a plurality of segments of the first data;
      determine that a first tile for a first segment of the plurality of segments matches a second tile of a second segment of the plurality of segments; and
      based on the determination that the first tile matches the second tile of the second segment of the plurality of segments, indicate a relationship between the first segment and the second segment;
      generate a behavioral analysis for the application based, at least in part, on the relationship between the first segment and the second segment;
      compare a third segment of second data collected from the application to segments included in the behavioral analysis; and
      based on a determination that no tiles of the third segment match tiles of segments included in the behavioral analysis, indicate that the application is experiencing an anomaly.

10. The apparatus of claim 9 further comprising instructions to:
   compare a fourth segment of second data collected from the application to segments included in the behavioral analysis; and
   based on a determination that a third tile of the fourth segment matches a fourth tile of a fifth segment included in the behavioral analysis, determine whether the fifth segment is related to other segments in the behavioral analysis; and either:
      based on a determination that the fifth segment is not related to other segments in the behavioral analysis, indicate that the application is experiencing an anomaly, or
      based on a determination that the fifth segment is related to other segments in the behavioral analysis, add the third segment to a cluster of segments comprising the fifth segment in the behavioral analysis.

11. The apparatus of claim 9, wherein the instructions to indicate the relationship between the first segment and the second segment comprises instructions to update an entry in a matrix corresponding to the first segment and the second segment.

12. The apparatus of claim 11, wherein the instructions to generate the behavioral analysis for the application based, at least in part, on the relationship between the first segment and the second segment comprises instructions to:
   determine a time between the first segment and the second segment; and
   indicate in the behavioral analysis that data of the first segment related to the operation of the application occurs at a frequency based on the time.

13. The apparatus of claim 9, wherein the instructions to generate the behavioral analysis of the application based, at least in part, on the relationship between the first segment and the second segment comprises instructions to:
   generate a first node for the first segment and a second node for the second segment in a graph data structure; and
   create an edge between the first node and the second node.

14. The apparatus of claim 13 further comprising instructions to:
   average values for each type of time-series measurements corresponding to the first and second segments; and
   display the averaged values in association with the first and second node of the graph data structure.

15. The apparatus of claim 9, wherein the instructions to generate the one or more tiles for each of the plurality of segments of the first data collected from the application comprises instructions to:
   divide the time-series measurements in the first data related to the application into the plurality of segments, wherein each of the plurality of segments corresponds to a time period of the time-series measurements; and
   for each segment of the plurality of segments,
      determine values of one or more of the time-series measurements indicated at boundaries of the segment; and
      store the values as a tile.

16. The apparatus of claim 15, wherein the instructions to divide the time-series measurements in the first data related to the application into a plurality of segments comprises instructions to at least one of:
   determine boundaries for each segment in the time-series measurements based on a time interval; and
   determine boundaries for each segment of the plurality of segments to be located at every specified number of measurements in the time-series measurements.

* * * * *